United States Patent
Obrecht

(10) Patent No.: US 8,389,623 B2
(45) Date of Patent: Mar. 5, 2013

(54) NITRILE RUBBERS

(75) Inventor: Werner Obrecht, Moers (DE)

(73) Assignee: LANXESS Deutschland GmbH, Leverkusen (DE)

( * ) Notice: Subject to any disclaimer, the term of this patent is extended or adjusted under 35 U.S.C. 154(b) by 546 days.

(21) Appl. No.: 12/031,014

(22) Filed: Feb. 14, 2008

(65) Prior Publication Data

US 2008/0293868 A1 Nov. 27, 2008

(30) Foreign Application Priority Data

May 22, 2007 (DE) .................... 10 2007 024 010

(51) Int. Cl.
C07F 7/18 (2006.01)
(52) U.S. Cl. .......... 524/565; 524/439; 526/222; 366/69; 264/239
(58) Field of Classification Search .................... 524/439
See application file for complete search history.

(56) References Cited

U.S. PATENT DOCUMENTS

| | | | | |
|---|---|---|---|---|
| 3,700,637 | A | * | 10/1972 | Finch .................. 525/329.3 |
| 3,915,909 | A | | 10/1975 | Schnoring et al. .......... 260/17 R |
| 4,119,759 | A | * | 10/1978 | Fischer et al. ............. 428/407 |
| 4,383,108 | A | | 5/1983 | Jorgensen, Jr. ............. 528/485 |
| 4,464,515 | A | | 8/1984 | Rempel et al. ............. 525/338 |
| 4,503,196 | A | | 3/1985 | Rempel et al. ............. 525/338 |
| 4,536,568 | A | | 8/1985 | Wunder .................. 528/487 |
| 4,581,417 | A | | 4/1986 | Buding et al. ............. 525/338 |
| 4,631,315 | A | | 12/1986 | Buding et al. ............. 525/338 |
| 4,746,707 | A | | 5/1988 | Fiedler et al. ............. 525/338 |
| 4,779,032 | A | | 10/1988 | Sakaegi et al. ............. 318/685 |
| 4,795,788 | A | | 1/1989 | Himmler et al. ............. 525/338 |
| 4,812,528 | A | | 3/1989 | Rempel et al. ............. 525/338 |
| 4,826,721 | A | | 5/1989 | Obrecht et al. ............. 428/252 |
| 4,920,176 | A | * | 4/1990 | Jorgensen, Jr. ............. 525/185 |
| 4,978,771 | A | | 12/1990 | Fiedler et al. ............. 558/459 |
| 5,585,459 | A | * | 12/1996 | Tanaka et al. ............. 528/486 |
| 6,498,223 | B2 | * | 12/2002 | Sakata et al. ............. 526/338 |
| 6,683,136 | B2 | | 1/2004 | Guo et al. ................. 525/329.3 |
| 2003/0236348 | A1 | | 12/2003 | Wendling et al. ........... 524/801 |
| 2005/0182159 | A1 | * | 8/2005 | Udagawa et al. ........... 523/332 |

FOREIGN PATENT DOCUMENTS

| | | |
|---|---|---|
| DE | 2539 132 | 3/1977 |
| DE | 27 51 786 | 5/1979 |
| DE | 0154 702 | 4/1982 |
| EP | 0 471 250 | 2/1992 |
| EP | 0 779 300 | * 6/1997 |
| EP | 0 779 300 | 12/1998 |
| EP | 0 692 496 | 1/1999 |
| EP | 0 779 301 | 8/2000 |
| GB | 785631 | 10/1957 |
| GB | 823823 | 11/1959 |
| GB | 823824 | 11/1959 |
| GB | 888040 | 1/1962 |
| JP | 7-316126 | 12/1995 |
| JP | 7-316127 | 12/1995 |
| JP | 7-316128 | 12/1995 |
| WO | 02/100905 | 12/2002 |
| WO | 02/100941 | 12/2002 |

OTHER PUBLICATIONS

W. Hofmann, Rubber Chem. Technol. 36 (1963) 1, "Vulcanizate Structure, Relaxation, and Tensile Strength of Polyisopresnes" pp. 815-834.
Ullmann's Encyclopedia of Industrial Chemistry, VCH Verlagsgesellschaft, Weinheim, 1993, pp. 255-261, „Rubber, 3. Synthetic.
Kolloid-Z. 154, (1957) 154-167 (1957), Von H. Wenning, "Elektrolytkoagulation von Buna S3 Latex".
Houben-Weyl (1961), Methoden der Org. Chemie, Makromolekulare Stoffe 1, p. 484, H. R. Kricheldorf: "Pulymerizsation von heterocyclischen Monomeren unter Ringöffnung".
Houben-Weyl (1961), Methoden der Org. Chemie, Makromolekulare Stoffe 1, p. 479 kationische, von P-Heterocyclen.
B. Welz "Atomic Absorption Spectrometry", 2nd Ed., Verlag Chemie, Weinheim (1985) Complete Book—Did not send.
Ullmann's Encyclopedia of Industrial Chemistry, 6th Ed., vol. 31, pp. 345-355 "Resins Natural" 5. Rosin (Colophony).
Ullmann's Encyclopedia of Industrial Chemistry, 6th Ed., vol. 13, pp. 75-108 "Fatty Acids".

* cited by examiner

*Primary Examiner* — Doris Lee
(74) *Attorney, Agent, or Firm* — Nicanor A. Kohncke

(57) ABSTRACT

An improved polymerization and work-up process makes it possible to produce specific nitrile rubbers which have a particular ion index and a particular magnesium content which is responsible for an excellent vulcanization rate and leads to vulcanizates having an advantageous property profile.

33 Claims, No Drawings

NITRILE RUBBERS

FIELD OF THE INVENTION

The invention relates to a nitrile rubber, a process for producing it, vulcanizable mixtures based on this nitrile rubber, also a process for producing vulcanizates from these mixtures and the vulcanizates obtained in this way.

BACKGROUND OF THE INVENTION

For the purposes of the present invention, nitrile rubbers, also referred to as "NBRs" for short, are rubbers which are copolymers or terpolymers of at least one $\alpha,\beta$-unsaturated nitrile, at least one conjugated diene and optionally one or more further copolymerizable monomers.

Such nitrile rubbers and processes for producing such nitrile rubbers are known, see, for example, W. Hofmann, Rubber Chem. Technol. 36 (1963) 1 and Ullmann's Encyclopedia of Industrial Chemistry, VCH Verlagsgesellschaft, Weinheim, 1993, pp. 255-261. This publication gives no indication as to whether and if appropriate how the vulcanization rate of such rubbers and the property profile, in particular the value of the modulus, can be influenced.

NBR is produced by emulsion polymerization, which firstly gives an NBR latex. The NBR solid is isolated from this latex by coagulation. Salts and acids are used for coagulation. In the coagulation of latices by means of metal salts, it is known that significantly larger amounts of electrolyte are required in the case of monovalent metal ions, e.g. in the form of sodium chloride, than in the case of polyvalent metal ions, e.g. in the form of calcium chloride, magnesium chloride or aluminium sulphate (Kolloid-Z. 154, 154 (1957)). It is also known that the use of polyvalent metal ions leads to "at least some inclusion of the emulsifier in the product" (Houben-Weyl (1961), Methoden der Org. Chemie, Makromolekulare Stoffe 1, p. 484). According to Houben-Weyl (1961), Methoden der Org. Chemie, Makromolekulare Stoffe 1, p. 479, "not only do the electrolytes used have to be very carefully washed out again, but the finished product should also be free of the catalysts and emulsifiers of the process batch. Even small amounts of residual electrolytes give turbid and cloudy pressed and injection-moulded parts, impair the electrical properties and increase the water absorption capacity of the finished product" (citation). Houben-Weyl gives no indication as to how a latex has to be worked up in order to give nitrile rubbers which vulcanize quickly and display a high modulus after vulcanization.

DD 154 702 discloses a process for the free-radical copolymerization of butadiene and acrylonitrile in emulsion, which is controlled by means of a specific, advantageously computer-aided metering program for the monomers and the molecular weight regulators, e.g. tert-dodecyl mercaptan, and in which the latices obtained are worked up by coagulation in an acid medium to give the solid rubber. A significant advantage of the process is said to be that the resin soaps and/or fatty acid soaps used as emulsifiers remain in the rubber as a result of the use of acids in the coagulation, i.e. they are not washed out as in the case of other processes. In addition to the advantage of good properties of the NBR, the improvement in the economics of the process and the avoidance of wastewater pollution by washed-out emulsifier are specifically advertised here. It is stated that the butadiene-acrylonitrile copolymers containing 10-30% by weight of acrylonitrile obtained have good elasticity and low-temperature properties combined with an increased swelling resistance and advantageous processability. Measures by means of which the vulcanization rate of the nitrile rubber and the property profile of the vulcanized NBR can be influenced are not revealed by the teachings of this patent.

JP 2790273 (Appl. 69 32,322) discloses that the use of amines in the coagulation of latices by means of magnesium salts, for example by means of a combination of diethylenetriamine and magnesium chloride, enables the initial vulcanization rate to be reduced and thus the scorch resistance of nitrile rubbers to be improved. Further information on this subject is not to be found in this prior art.

DE-A 23 32 096 discloses that rubbers can be precipitated from their aqueous dispersions by means of methylcellulose and a water-soluble alkali metal, alkaline earth metal, aluminium or zinc salt. Preference is given to using sodium chloride as water-soluble salt. It is stated that an advantage of this process is that it gives a coagulum which is virtually completely free of extraneous constituents such as emulsifiers, catalysts residues and the like since these extraneous materials are removed together with the water when the coagulum is separated off and any remaining residues are completely washed out by means of further water. Information about the vulcanization behaviour of rubbers produced in this way is not given. In DE-A 24 25 441, the electrolyte coagulation of rubber latices is carried out using 0.1-10% by weight (based on the rubber) of water-soluble $C_2$-$C_4$ alkylcelluloses or hydroxyalkylcelluloses in combination with from 0.02 to 10% by weight (based on the rubber) of a water-soluble alkali metal, alkaline earth metal, aluminium or zinc salt as auxiliary instead of methylcellulose. Here too, preference is given to using sodium chloride as water-soluble salt. The coagulum is separated off mechanically, optionally washed with water and the remaining water is removed. Here too, it is stated that the extraneous materials are, as in DE-A 23 32 096, essentially completely removed together with the water when the coagulum is separated off and any remaining residues are washed out completely in the washing with further water.

In DE-A 27 51 786, it is established that the precipitation and isolation of rubbers from their aqueous dispersions can be carried out by means of a smaller amount of (hydroxy)alkylcellulose when from 0.02 to 0.25% by weight of a water-soluble calcium salt is used. A further advantage is said to be that this process gives an extremely pure coagulum which is essentially completely free of extraneous constituents such as emulsifiers, catalysts residues and the like. These extraneous materials are removed together with the water when the coagulum is separated off and any remaining residues can be washed out by means of water. It is also stated that the properties of the isolated rubbers are not adversely affected by a calcium salt being used for coagulation. Rather, it is said that a rubber whose vulcanization properties are not impaired and are fully satisfactory is obtained. This is presented as surprising since it is said that impairment of the rubber properties is frequently observed when polymers are precipitated from dispersions by means of polyvalent metal ions such as calcium or aluminium ions. Houben-Weyl (1961), Methoden der Org. Chemie., Makromolekulare Stoffe 1, pp. 484/485, is offered as evidence for the last statement. In contrast, the rubbers of DE-A 27 51 786 display no slowing or worsening of, for example, the initial vulcanization and/or full vulcanization.

None of the documents DE-A 23 32 096, DE-A 24 25 441 and DE-A 27 51 786 disclose which measures have to be taken in order to achieve rapid vulcanization and good vulcanizate properties.

As in the case of the above-described patents, the object of DE-A 30 43 688, is also to achieve a large reduction in the amounts of electrolyte required for coagulation of the latex. According to the teachings of DE-A 30 43 688, this is achieved by using either plant-based protein-like materials or polysaccharides such as starch and if appropriate water-soluble polyamine compounds as auxiliaries in addition to the inorganic coagulate in the electrolyte coagulation of latices. As inorganic coagulates, preference is given to alkali metal or alkaline earth metal salts. The specific additives make it possible to achieve a reduction in the amounts of salts used for quantitative coagulation of the latex. DE-A 3 043 688 gives no information as to how rapid vulcanization can be achieved as a result of the production and/or work-up of the nitrile rubber.

In U.S. Pat. No. 4,920,176, it is stated and evidenced by experimental data that very high sodium, potassium and calcium contents and also emulsifiers remain in the nitrile rubber in coagulation of a nitrile rubber latex by means of inorganic salts such as sodium chloride or calcium chloride. However, this is undesirable and, according to the teachings of U.S. Pat. No. 4,920,176, water-soluble cationic polymers are used instead of inorganic salts in the coagulation of nitrile rubber latices for the purpose of obtaining very pure nitrile rubber. The polymers used here are, for example, ones based on epichlorohydrin and dimethylamine. These auxiliaries are used with the aim of significantly reducing the amounts of salts remaining in the product. The vulcanizates obtained therefrom display lower swelling on storage in water and an increased electrical resistance. In the patent text, the property improvements mentioned are attributed purely qualitatively to the minimal cation contents remaining in the product. A more detailed explanation of the phenomena observed is not given. U.S. Pat. No. 4,920,176 also gives no information as to whether and how the vulcanization behaviour and the magnitude of the modulus can be controlled by means of the production and work-up of the nitrile rubber.

The objective of EP-A-1 369 436 is to provide nitrile rubbers having a high purity. In particular, the residue emulsifier contents of these nitrile rubbers are very low. The particular cation contents in the form of the sodium, potassium, magnesium and calcium contents are also very low. The nitrile rubbers are produced by carrying out the emulsion polymerization in the presence of fatty acid and/or resin acid salts as emulsifiers, then carrying out coagulation of the latex by means of acids, optionally with addition of precipitants. As acids, it is possible to use all mineral and organic acids which allow the desired pH values to be set. As additional precipitant, use is made of, for example, alkali metal salts of inorganic acids. The fatty and resin acids formed here are subsequently washed out by means of aqueous alkali metal hydroxide solutions and the polymer is finally subjected to shear until a residual moisture content of less than 20% is obtained. EP-A-1 369 436 gives no information on the production of nitrile rubbers which display rapid vulcanization and a high modulus after vulcanization.

EP-A-0 692 496, EP-A-0 779 301 and EP-A-0 779 300 in each case describe nitrile rubbers based on an unsaturated nitrile and a conjugated diene. All the nitrile rubbers contain 10-60% by weight of unsaturated nitrile and have a Mooney viscosity in the range 15-150 or, according to EP-A-0 692 496, in the range 15-65 and all have at least 0.03 mol of $C_{12}$-$C_{16}$-alkylthio group per 100 mol of monomer units, with this alkylthio group having at least three tertiary carbon atoms and a sulphur atom which is bound directly to at least one of the tertiary carbon atoms.

The nitrile rubbers are in each case produced in the presence of a $C_{12}$-$C_{16}$-alkyl thiol having a corresponding structure as molecular weight regulator which functions as "chain transfer agent" and is thus incorporated as end group into the polymer chains.

In the case of the nitrile rubbers of EP-A-0 779 300, it is stated that they have a width "ΔAN" (AN=acrylonitrile) of the composition distribution of the unsaturated nitrile in the copolymer in the range from 3 to 20. The process for producing them differs from that of EP-A-0 692 496 in that only 30-80% by weight of the total amount of monomers is used at the beginning of the polymerization and the remaining amount of monomers is fed in only at a conversion of the polymerization of 20-70% by weight.

In the case of the nitrile rubbers of EP-A-0 779 301, it is stated that they contain 3-20% by weight of a fraction having a low molecular weight and a number average molecular weight $M_0$ of less than 35 000. The process for producing them differs from that of EP-A-0 692 496 in that only 10-95% by weight of the alkyl thiol are mixed into the monomer mixture before the polymerization and the remaining amount of the alkyl thiol is fed in only after a polymerization conversion of 20-70% by weight has been reached.

With regard to the coagulation of the latex, all three patent applications EP-A-0 692 496, EP-A-0 779 301 and EP-A-0 779 300 state that any coagulants can be used. As inorganic coagulant, calcium chloride and aluminium chloride are mentioned and used. According to EP-A-0 779 301 and EP-A-0 779 300, a preferred embodiment is a nitrile rubber which is essentially halogen-free and is obtained by carrying out the coagulation of the latex in the presence of a non-ionic surface-active auxiliary and using halogen-free metal salts such as aluminium sulphate, magnesium sulphate and sodium sulphate. Coagulation using aluminium sulphate or magnesium sulphate is said to be preferred. The resulting, essentially halogen-free nitrile rubber has a halogen content of not more than 3 ppm.

In Comparative Example 6 of EP-A-779 300 and Comparative Example 7 of EP-A-0 779 301, the coagulation of the latex is carried out using a mixture of NaCl and $CaCl_2$, with the $CaCl_2$ being used in large amounts and the weight ratio of NaCl to $CaCl_2$ being 1:0.75. In respect of the scorching time and the stress at 100% elongation, no significant differences from the other examples shown in the respective Table 12 or 13 are found.

According to EP-A-0 692 496, EP-A-0 779 300 and EP-A-0 779 301, it is essential to use alkyl thiols in the form of the compounds 2,2,4,6,6-pentamethylheptane-4-thiol and 2,2,4,6,6,8,8-heptamethylnonane-4-thiol as molecular weight regulators for the production of the nitrile rubbers. It is clearly pointed out here that the use of the conventional known tert-dodecyl mercaptan as regulator gives nitrile rubbers having poorer properties.

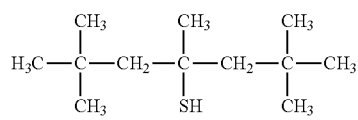

2,2,4,6,6-pentamethylheptane-4-thiol

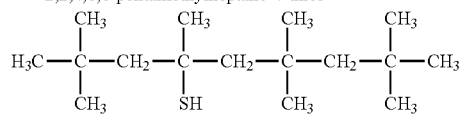

2,2,4,6,6,8,8-heptamethylnonane-4-thiol

In the case of the nitrile rubbers produced in EP-A-0 692 496, EP-A-0 779 300 and EP-A-0 779 301, it is stated that they have an advantageous property profile, good processability of the rubber mixtures and make low fouling of the mould possible during processing. The vulcanizates obtained are said to have a good combination of low-temperature resistance and oil resistance and possess good mechanical properties. It is also stated that high polymerization conversions of greater than 75%, preferably greater than 80%, in the production of the nitrile rubbers enable a high productivity to be achieved and the vulcanization rate in vulcanization using sulphur or peroxides is high, in particular in the case of NBR grades for injection moulding. It is also indicated that the nitrile rubbers have a short initial vulcanization time and a high crosslinking density. As evidence of the rapid vulcanization of the nitrile rubbers produced according to EP-A-0 692 496, EP-A-0 779 300 and EP-A-0 779 301, the initial vulcanization time (known as the "scorch time" (measured as "$T_5$")) is presented, although this is merely a measure of the initial vulcanization rate. Nothing is said about the overall vulcanization rate and how this may be able to be influenced. The crosslinking density is described only by quotation of the maximum torque value (measured as $V_{max}$).

In practice, short scorch times are not always desirable, since the corresponding rubber mixtures cannot be processed reliably because of such a fast initial vulcanization. Particularly in injection moulding, rapid initial vulcanization is not satisfactory. Short cycle times are critical for economical processing. To achieve short cycle times, the difference between full vulcanization rate and initial vulcanization rate is critical. This is measured as "$t_{90}$-$t_{10}$", with $t_{90}$ being the time at which 90% of the final vulcanization has taken place and $t_{10}$ is the time at which 10% of the final vulcanization has taken place. However, use of the regulators 2,2,4,6,6-pentamethylheptane-4-thiol and 2,2,4,6,6,8,8-heptamethylnonane-4-thiol used in EP-A-0 692 496, EP-A-0 779 300 and EP-A-0 779 301 does not necessarily make setting of rapid vulcanization characteristics and setting of a high modulus possible.

On this subject, EP-A-0 692 496 indicates, inter alia, that many methods have already been proposed for setting high vulcanization rates, e.g. the use of minimal amounts of emulsifiers and precipitants, so that only minimal amounts of emulsifiers and precipitants remain in the NBR. However, according to EP-A-0 692 49, these measures are not satisfactory (p. 2, lines 22-28).

In summary, it may be said that, despite comprehensive literature, no measures which allow the overall vulcanization rate of nitrile rubbers and in particular the difference between full vulcanization rate and initial vulcanization rate ($t_{90}$-$t_{10}$) to be influenced without other important properties of the nitrile rubber, in particular the vulcanizate properties, being adversely affected have become known to the present time.

SUMMARY OF THE INVENTION

It was therefore an object of the present invention to provide a process which gives nitrile rubbers which allow fast initial and full vulcanization in subsequent processing and leads to vulcanizates having a good property profile.

It has surprisingly been found that nitrile rubbers having an excellent vulcanization rate and outstanding vulcanizate properties are obtained when the emulsion polymerization is carried out using specific molecular weight regulators and at the same time the coagulation of the latex is carried out in a specific way using at least one magnesium salt as coagulant, so that the nitrile rubbers have a specific content of cations as a result of these various process measures.

DETAILED DESCRIPTION OF THE INVENTION

The present invention therefore provides a process for producing nitrile rubbers by emulsion polymerization of at least one $\alpha,\beta$-unsaturated nitrile, at least one conjugated diene and optionally one or more further copolymerizable monomers, with the latex which is initially obtained in the polymerization and contains the nitrile rubber being subjected to coagulation and the coagulated nitrile rubber obtained subsequently being washed, characterized in that
  (i) the emulsion polymerization is carried out in the presence of at least one alkyl thiol containing 12-16 carbon atoms and at least three tertiary carbon atoms, with the sulphur being bound to one of these tertiary carbon atoms, and
  (ii) the pH of the latex obtained in the emulsion polymerization is set to at least 6 before coagulation and the temperature of the latex is set to a value below 45° C. before addition of the magnesium salt.

The present invention further provides a nitrile rubber which contains repeating units of at least one $\alpha,\beta$-unsaturated nitrile, at least one conjugated diene and optionally one or more further copolymerizable monomers and has an ion index ("II") according to the general formula (I) in the range from 0 to 60 ppm×g/mol.

$$II = 3\left[\frac{c(\text{Ca}^{2+})}{40\,\text{g/mol}} + \frac{c(\text{Mg}^{2+})}{24\,\text{g/mol}}\right] - \left[\frac{c(\text{Na}^+)}{23\,\text{g/mol}} + \frac{c(\text{K}^+)}{39\,\text{g/mol}}\right] \quad (I)$$

where $c(\text{Ca}^{2+})$, $c(\text{Mg}^{2+})$, $c(\text{Na}^+)$ and $c(\text{K}^+)$ indicate the concentrations of the calcium, magnesium, sodium and potassium ions in the nitrile rubber in ppm and the concentration of magnesium ions $c(\text{Mg}^{2+})$ is in the range from 50 to 250 ppm.

These nitrile rubbers of the invention have a high vulcanization rate, characterized by the difference between full vulcanization time and initial vulcanization time ($t_{90}$-$t_{10}$) and also good vulcanizate properties (in particular a high modulus).

Such nitrile rubbers have not been known hitherto from the prior art.

In the examples of EP-A-1 369 436, the cation contents are given for the nitrile rubbers described, with a value of <1 ppm being reported for the Mg content. On the basis of these figures, the ion indices according to the above equation (I) can be calculated using, in the interests of simplicity, an Mg content of 1 ppm in equation (I) both for Example 1 and for Example 2. The ion indices calculated in this way are outside the values observed in the case of the nitrile rubbers of the invention: in Example 1 of EP-A-1 369 436, the ion index is −12.4 ppm×mol/g and that in Example 2 is −7.8 ppm×mol/g. At the same time, EP-A-1 369 436 gives no reasons for believing that the cation mix has an influence on the overall vulcanization rate, especially since EP-A-1 369 436 gives no information about the cation mix necessary to obtain a nitrile rubber having the desired high initial and full vulcanization rate together with a good property profile.

In the examples of U.S. Pat. No. 4,920,176, the latices of nitrile rubbers are worked up using various precipitants. Examples A-D are obtained using NaCl or CaCl$_2$ as coagulant and a result of this is an extremely low magnesium content. Examples E-1 of U.S. Pat. No. 4,920,176 either have ion indices which are far larger than those according to the present invention or else have magnesium contents which are significantly above or below the range to be adhered to here according to the invention.

In none of the examples of EP-A-0 692 496, EP-A-0 779 300 and EP-A-0 779 301 is a magnesium salt used for coagulation of the latex. However, magnesium contents in the range from 50 to 250 ppm cannot be achieved without using a magnesium salt in the coagulation.

Determination of the Cation Contents:

To determine the cation contents for determination of the ion index II according to the present invention, the following method has proven itself and is used: 0.5 g of the nitrile rubbers are digested by dry ashing at 550° C. in a platinum crucible with subsequent dissolution of the ash in hydrochloric acid. After appropriate dilution of the digestion solution with deionized water, the metal contents are determined by ICP-OES (inductively coupled plasma-optical emission spectrometry) at the following wavelengths:

Calcium: 317.933 nm,
Potassium: 766.491 nm,
Magnesium: 285.213 nm.
Sodium: 589.592 nm against calibration solutions matched to the acid matrix. Depending on the concentration of the elements in the digestion solution and the sensitivity of the measuring instrument used, the concentrations of the sample solutions are matched to the linear region of the calibration for the respective wavelengths used (B. Welz "Atomic Absorption Spectrometry", 2nd Ed., Verlag Chemie, Weinheim 1985).

In the ion index according to the formula (I), the metal contents are divided by the atomic weights of the respective metals. For this reason, the unit of the II is [ppm×mol/g].

The ion index is preferably in the range from 10 to 55 ppm×mol/g, particularly preferably in the range from 10 to 50 ppm×mol/g.

Nitrile Rubber:

The nitrile rubbers of the invention have repeating units of at least one $\alpha,\beta$-unsaturated nitrile, at least one conjugated diene and optionally one or more further copolymerizable monomers.

The conjugated diene can have any nature. Preference is given to using ($C_4$-$C_6$)-conjugated dienes. Particular preference is given to 1,3-butadiene, isoprene, 2,3-dimethylbutadiene, piperylene, 1,3-pentadiene or mixtures thereof. In particular, 1,3-butadiene or isoprene or mixtures thereof are used. Very particular preference is given to 1,3-butadiene.

As $\alpha,\beta$-unsaturated nitrile, it is possible to use any known $\alpha,\beta$-unsaturated nitrile; preference is given to ($C_3$-$C_5$)-$\alpha,\beta$-unsaturated nitriles such as acrylonitrile, methacrylonitrile, 1-chloroacrylonitrile, ethacrylonitrile or mixtures thereof. Particular preference is given to acrylonitrile.

A particularly preferred nitrile rubber is thus a copolymer of acrylonitrile and 1,3-butadiene.

Apart from the conjugated diene and the $\alpha,\beta$-unsaturated nitrile, one or more further copolymerizable monomers, e.g. $\alpha,\beta$-unsaturated monocarboxylic or dicarboxylic acids, their esters or amides, can be additionally used. Such nitrile rubbers are customarily also referred to as carboxylated nitrile rubbers, or "XNBRs" for short.

As $\alpha,\beta$-unsaturated monocarboxylic or dicarboxylic acids, it is possible to use, for example, fumaric acid, maleic acid, acrylic acid, methacrylic acid, crotonic acid and itaconic acid. Preference is given to maleic acid, acrylic acid, methacrylic acid and itaconic acid.

As esters of $\alpha,\beta$-unsaturated carboxylic acids, use is made of, for example, alkyl esters, alkoxyalkyl esters, hydroxyalkyl esters or mixtures thereof.

Particularly preferred alkyl esters of $\alpha,\beta$-unsaturated carboxylic acids are methyl(methacrylate, ethyl(meth)acrylate, propyl(meth)acrylate, n-butyl(meth)acrylate, t-butyl(meth) acrylate, hexyl(meth)acrylate, 2-ethylhexyl(meth)acrylate, octyl(meth)acrylate and lauryl(meth)acrylate. In particular, n-butyl acrylate is used.

Particularly preferred alkoxyalkyl esters of $\alpha,\beta$-unsaturated carboxylic acids are methoxyethyl(meth)acrylate, ethoxyethyl(meth)acrylate and methoxyethyl(meth)acrylate. In particular, methoxyethyl acrylate is used.

Particularly preferred hydroxyalkyl esters of $\alpha,\beta$-unsaturated carboxylic acids are hydroxyethyl(meth)acrylate, hydroxypropyl(meth)acrylate and hydroxybutyl(meth)acrylate.

Further esters of $\alpha,\beta$-unsaturated carboxylic acids which can be used are, for example, polyethylene glycol(meth)acrylate, polypropylene glycol(meth)acrylate, glycidyl(meth) acrylate, epoxy(meth)acrylate and urethane(meth)acrylate.

Further possible monomers are vinylaromatics such as styrene, $\alpha$-methylstyrene and vinylpyridine.

The proportions of conjugated diene and $\alpha,\beta$-unsaturated nitrile in the nitrile rubbers of the invention can vary within a wide range. The proportion of the conjugated diene or of the sum of conjugated dienes is usually in the range from 20 to 95% by weight, preferably in the range from 40 to 90% by weight, particularly preferably in the range from 60 to 85% by weight, based on the total polymer. The proportion of the $\alpha,\beta$-unsaturated nitrile or of the sum of $\alpha,\beta$-unsaturated nitriles is usually from 5 to 80% by weight, preferably from 10 to 60% by weight, particularly preferably from 15 to 40% by weight, based on the total polymer. The proportions of the monomers in each case add up to 100% by weight.

The additional monomers can be present in amounts of from 0 to 40% by weight, preferably from 0.1 to 40% by weight, particularly preferably from 1 to 30% by weight, based on the total polymer. In this case, corresponding proportions of the conjugated diene or dienes and/or of the $\alpha,\beta$-unsaturated nitrile or nitriles are replaced by proportions of these additional monomers, with the proportions of all monomers continuing to add up to 100% by weight.

If esters of (meth)acrylic acid are used as additional monomers, they are usually used in amounts of from 1 to 25% by weight.

If $\alpha,\beta$-unsaturated monocarboxylic or dicarboxylic acids are used as additional monomers, they are usually used in amounts of less than 10% by weight.

The nitrogen content of the nitrile rubbers of the invention is determined by the Kjeldahl method in accordance with DIN 53 625. Owing to the content of polar comonomers, the nitrile rubbers are usually soluble in methyl ethyl ketone to an extent of $\geq 85\%$ by weight at 20° C.

The nitrile rubbers have Mooney viscosities (ML (1+4@100° C.)) of from 10 to 150, preferably from 20 to 100, Mooney units. The Mooney viscosity (ML (1+4@100° C.)) is determined at 100° C. by means of a shear disc viscosimeter in accordance with DIN 53523/3 or ASTM D 1646.

The glass transition temperatures of the nitrile rubbers are in the range from −70° C. to +10° C., preferably in the range from −60° C. to 0° C.

Preference is given to nitrile rubbers according to the invention which comprise repeating units of acrylonitrile, 1,3-butadiene and optionally of one or more further copolymerizable monomers. Preference is likewise given to nitrile rubbers having repeating units of acrylonitrile, 1,3-butadiene and one or more $\alpha,\beta$-unsaturated monocarboxylic or dicarboxylic acids, their esters or amides, and in particular repeating units of an alkylester of an $\alpha,\beta$-unsaturated carboxylic acid, very particularly preferably of methyl(meth)acrylate, ethyl(meth)acrylate, propyl(meth)acrylate, n-butyl(meth)acrylate, t-butyl(meth)acrylate, hexyl(meth)acrylate, 2-ethylhexyl(meth)acrylate, octyl(meth)acrylate or lauryl(meth)acrylate.

Process for Producing the Nitrile Rubbers:

The nitrile rubbers are produced by emulsion polymerization in the process of the invention.

As emulsifiers, it is possible to use water-soluble salts of anionic emulsifiers or uncharged emulsifiers. Preference is given to using anionic emulsifiers.

As anionic emulsifiers, it is possible to use modified resin acids which are obtained by dimerization, disproportionation, hydrogenation and modification of resin acid mixtures containing abietic acid, neoabietic acid, palustric acid, laevopimaric acid. A particularly preferred modified resin acid is disproportionated resin acid (Ullmann's Encyclopedia of Industrial Chemistry, 6th Edition, Volume 31, pp. 345-355).

It is also possible to use fatty acids as anionic emulsifiers. These contain from 6 to 22 carbon atoms per molecule. They can be fully saturated or have one or more double bonds in the molecule. Examples of fatty acids are caproic acid, lauric acid, myristic acid, palmitic acid, stearic acid, oleic acid, linoleic acid, linolenic acid. The carboxylic acids are usually based on origin-specific oils or fats such as caster oil, cottonseed oil, peanut oil, linseed oil, coconut oil, palm kernel oil, olive oil, rapeseed oil, soybean oil, fish oil and beef talo, etc. (Ullmann's Encyclopedia of Industrial Chemistry, 6th Edition, Volume 13, pp. 75-108). Preferred carboxylic acids are derived from coconut fatty acid and from beef talo and are partially or fully hydrogenated.

Such carboxylic acids based on modified resin acids or fatty acids are used as water-soluble lithium, sodium, potassium and ammonium salts. The sodium and potassium salts are preferred.

Further anionic emulsifiers are sulphonates, sulphates and phosphates which are bound to an organic radical. Possible organic radicals are aliphatic radicals, aromatic radicals, alkylated aromatics, fused aromatics and methylene-bridged aromatics, with the methylene-bridged and fused aromatics being able to be additionally alkylated. The length of the alkyl chains is from 6 to 25 carbon atoms. The length of the alkyl chains bound to the aromatics is from 3 to 12 carbon atoms.

The sulphates, sulphonates and phosphates are used as lithium, sodium, potassium and ammonium salts. The sodium, potassium and ammonium salts are preferred.

Examples of such sulphonates, sulphates and phosphates are Na laurylsulphate, Na-alkylsulphonate, Na-alkylarylsulphonate, Na salts of methylene-bridged aryl sulphonates, Na salts of alkylated naphthalenesulphonates and the Na salts of methylene-bridged naphthalenesulphonates which can also be oligomerized, with the degree of oligomerization being in the range from 2 to 10. The alkylated naphthalenesulphonic acids and the methylene-bridged (and optionally alkylated) naphthalenesulphonic acids are usually present as mixtures of isomers which can also contain more than 1 sulphonic acid group (from 2 to 3 sulphonic acid groups) in the molecule. Particular preference is given to Na laurylsulphate, Na alkylsulphonate mixtures having from 12 to 18 carbon atoms, Na alkylarylsulphonates, Na diisobutylenenaphthalenesulphonate, methylene-bridged polynaphthalenesulphonate mixtures and methylene-bridged arylsulphonate mixtures.

Uncharged emulsifiers are derived from addition products of ethylene oxide and of propylene oxide onto compounds having a sufficiently acidic hydrogen. These include, for example, phenol, alkylated phenol and alkylated amines. The average degrees of polymerization of the epoxides are in the range from 2 to 20. Examples of uncharged emulsifiers are ethoxylated nonylphenols having 8, 10 and 12 ethylene oxide units. The uncharged emulsifiers are usually not used alone but in combination with anionic emulsifiers.

Preference is given to the Na and K salts of disproportionated abietic acid and of partially hydrogenated talo fatty acid and also mixtures thereof sodium laurylsulphate, Na alkylsulphonates, sodium alkylbenzenesulfonate and also alkylated and methylene-bridged naphthalenesulfonic acids.

The emulsifiers are used in an amount of from 0.2 to 15 parts by weight, preferably from 0.5 to 12.5 parts by weight, particularly preferably from 1.0 to 10 parts by weight, per 100 parts by weight of the monomer mixture.

The emulsion polymerization is carried out using the emulsifiers mentioned. If latices which due to some instability tend to premature self-coagulation are obtained after the polymerization, the emulsifiers mentioned can also be used for after-stabilization of the latices. This can, in particular, be necessary before removal of unreacted monomers by treatment with steam or before storage of the latex.

To regulate the molecular weight of the nitrile rubber formed, use is made of at least one alkyl thiol which contains 12-16 carbon atoms and at least three tertiary carbon atoms, with the sulphur being bound to one of these tertiary carbon atoms. These mercaptans can be used either individually or in mixtures. Suitable mercaptans are, for example, the addition compounds of hydrogen sulphide onto oligomerized propene, in particular tetrameric propene, or onto oligomerized isobutene, in particular rimeric isobutene, which are frequently referred to as tertiary dodecyl mercaptan ("t-DDM") in the literature.

Such alkyl thiols or (isomer) mixtures of alkyl thiols are either commercially available or can be prepared by a person skilled in the art using methods which are adequately described in the literature (see, for example, JP 07-316126, JP 07-316127 and JP 07-316128 and also GB 823,823 and GB 823,824).

A preferred example of an alkyl thiol which comes within the above definition is 2,2,4,6,6,8,8-pentamethylheptane-4-thiol.

Furthermore, particular preference is given to a novel mixture of $C_{12}$-mercaptans containing 2,2,4,6,6-pentamethylheptane-4-thiol,
2,4,4,6,6-pentamethylheptane-2-thiol,
2,3,4,6,6-pentamethylheptane-2-thiol and
2,3,4,6,6-pentamethylheptane-3-thiol, which together with a process for preparing it as described in a patent application of Lanxess Deutschland GmbH filed on the same day. This specific novel mixture is preferably obtained by reaction of hydrogen sulphide with triisobutene at temperatures in the range from 0° C. to −60° C. in a continuous process in which (a) the hydrogen sulphide is subjected to drying before the reaction,
(b) the triisobutene used has a water content of not more than 70 ppm,
(c) boron trifluoride is used as catalyst in amounts of not more than 1.5% by weight, based on the triisobutene used,
(d) the reaction is carried out in the absence of compounds which form complexes with boron trifluoride and
(e) the reaction mixture is brought into contact with an aqueous alkali solution after the reaction to remove the catalyst.

The molecular weight regulator is used in an amount of from 0.05 to 3 parts by weight, preferably from 0.1 to 1.5 parts by weight, per 100 parts by weight of the monomer mixture. It is possible to use either individual regulators or mixtures of various regulators.

The molecular weight regulator or molecular weight regulator mixture is introduced either at the beginning of the polymerization or else in portions during the polymerization, with preference being given to addition of all or individual components of the regulator mixture in portions during the polymerization.

Owing to its function, the molecular weight regulator is to a certain extent present in the form of end groups in the nitrile rubber, i.e. the nitrile rubber has a certain amount of alkyl thiol end groups. When the above-described novel mixture of $C_{12}$-mercaptans is used, these end groups are thus the corresponding thiol end groups of the thiols present in the regulator mixture, i.e. 2,2,4,6,6-pentamethylheptane-4-thio and/or 2,4,4,6,6-pentamethylheptane-2-thio and/or 2,3,4,6,6-pentamethylheptane-2-thio and/or 2,3,4,6,6-pentamethylheptane-3-thio end groups.

Initiation of the emulsion polymerization is typically carried out using polymerization initiators which disintegrate into free radicals. As such initiators include compounds which contain an —O—O— unit (peroxo compounds) or an —N≡N— unit (azo compound).

The peroxo compounds include hydrogen peroxide, peroxodisulphates, peroxodiphosphates, hydroperoxides, peracids, peracid esters, peracid anhydrides and peroxides having two organic radicals. Suitable salts of peroxodisulphuric acid and of peroxodiphosphoric acid are the sodium, potassium and ammonium salts. Suitable hydroperoxides are, for example, t-butyl hydroperoxide, cumene hydroperoxide and p-menthane hydroperoxide. Suitable peroxides having two organic radicals are dibenzoyl peroxide, bis-2,4-dichlorobenzoyl peroxide, di-t-butyl peroxide, dicumyl peroxide, t-butyl perbenzoate, t-butyl peracetate, etc. Suitable azo compounds are azobisisobutyronitrile, azobisvaleronitrile and azobiscyclohexanenitrile.

Hydrogen peroxide, hydro peroxides, peracids, peracid esters, peroxodisulphate and peroxodisphosphate are also used in combination with reducing agents. Suitable reducing agents are sulphenates, sulphinates, sulphoxylates, dithionite, sulphite, metabisulphite, disulphite, sugar, urea, thiourea, xanthogenates, thioxanthogenates, hydrazinium salts, amines and amine derivatives such as aniline, dimethylaniline, monoethanolamine, diethanolamine or triethanolamine. Initiator systems consisting of an oxidizing agent and a reducing agent are referred to as redox systems. When redox systems are employed, salts of transition metals such as iron, cobalt or nickel are frequently also used in combination with suitable complexing agents such as sodium ethylenediaminetetraacetate, sodium nitrilotriacetate and trisodium phosphate or tetrapotassium diphosphate.

Preferred redox systems are: 1) potassium peroxodisulphate in combination with triethanolamine, 2) ammonium peroxodiphosphate in combination with sodium metabisulphite ($Na_2S_2O_5$), 3) p-methane hydroperoxide/sodium formaldehydesulphoxylate in combination with Fe(II) sulphate ($FeSO_4 \cdot 7 H_2O$), sodium ethylenediaminoacetate and trisodium phosphate, 4) cumene hydroperoxide/sodium formaldehydesulphoxylate in combination with Fe(II) sulphate ($FeSO_4 \cdot 7 H_2O$), sodium ethylenediaminoacetate and tetrapotassium disphosphate.

The amount of oxidizing agent is from 0.001 to 1 part by weight per 100 parts by weight of monomer. The molar amount of reducing agent is in the range from 50% to 500%, based on the molar amount of the oxidizing agent used.

The molar amount of complexing agents is based on the amount of transition metal used and is usually equimolar with this.

To carry out the polymerization, all or individual components of the initiator system are introduced at the beginning of the polymerization or during the polymerization.

The addition of all or individual components of the activator system in portions during the polymerization is preferred. The sequential addition enables the reaction rate to be controlled.

The polymerization time is in the range from 5 h to 15 h and depends essentially on the acrylonitrile content of the monomer mixture and on the polymerization temperature.

The polymerization temperature is in the range from 0 to 30° C., preferably in the range from 5 to 25° C.

After conversions in the range from 50 to 90%, preferably in the range from 70 to 85%, have been reached, the polymerization is stopped.

For this purpose, a stopper is added to the reaction mixture. Suitable stoppers are, for example, dimethyl dithiocarbamate, Na nitrite, mixtures of dimethyl dithiocarbamate and Na nitrite, hydrazine and hydroxylamine and also salts derived therefrom, e.g. hydrazinium sulphate and hydroxylammonium sulphate, diethylbydroxylamine, diisopropylhydroxylamine, water-soluble salts of hydroquinone, sodium dithionite, phenyl-α-naphthylamine and aromatic phenols such as tert-butylcatechol or phenothiazine.

The amount of water used in the emulsion polymerization is in the range from 100 to 900 parts by weight, preferably in the range from 120 to 500 parts by weight, particularly preferably in the range from 150 to 400 parts by weight, of water per 100 parts by weight of the monomer mixture.

To reduce the viscosity during the polymerization, to adjust the pH and also as pH buffer, salts can be added to the aqueous phase in the emulsion polymerization. Typical salts are salts of monovalent metals in the form of potassium and sodium hydroxide, sodium sulphate, sodium carbonate, sodium hydrogencarbonate, sodium chloride and potassium chloride. Preference is given to sodium and potassium hydroxide, sodium hydrogencarbonate and potassium chloride. The amounts of these electrolytes are in the range from 0 to 1 part by weight, preferably from 0 to 0.5 part by weight, per 100 parts by weight of the monomer mixture.

The polymerization can be carried out either batchwise or continuously in a cascade of stirred vessels.

To achieve a uniform course of the polymerization, only part of the initiator system is used to start the polymerization and the remainder is fed in during the polymerization. The polymerization is usually started using from 10 to 80% by weight, preferably 30-50% by weight, of the total amount of initiator. The introduction of individual constituents of the initiator system after commencement of the polymerization is also possible.

If chemically uniform products are to be produced, further acrylonitrile or butadiene is introduced when the composition goes outside the azeotropic butadiene/acrylonitrile ratio. Further introduction is preferably carried out in the case of NBR grades having acrylonitrile contents of from 10 to 34% by weight and in the case of grades containing from 4 to 50% by weight of acrylonitrile (W. Hofmann, Rubber Chem. Technol. 36 (1963) 1). The further introduction is, as indicated, for example, in DD 154 702, preferably carried out under computer control on the basis of a computer program.

To remove unreacted monomers and volatile constituents, the stopped latex is subjected to a steam distillation. Here, temperatures in the range from 70° C. to 150° C. are employed, with the pressure being reduced at temperatures of <100° C.

Before removal of the volatile constituents, the latex can be after-stabilized by means of an emulsifier. For this purpose, it is advantageous to use the abovementioned emulsifiers in amounts of from 0.1 to 2.5% by weight, preferably from 0.5 to 2.0% by weight, per 100 parts by weight of nitrile rubber.

Coagulation of the Latex:

Before or during coagulation of the latex, one or more ageing inhibitors can be added to the latex. Phenolic, amine and other ageing inhibitors are suitable for this purpose.

Suitable phenolic ageing inhibitors are alkylated phenols, styrenized phenol, sterically hindered phenols such as 2,6-di-tert-butylphenol, 2,6-di-tert-butyl-p-cresol (BHT), 2,6-di-tert-butyl-4-ethylphenol, sterically hindered phenols containing ester groups, sterically hindered phenols containing thioethers, 2,2'-methylenebis(4-methyl-6-tert-butylphenol) (BPH) and sterically hindered thiobisphenols.

If discoloration of the rubber is of no importance, amine ageing inhibitors, e.g. mixtures of diaryl-p-phenylenediamines (DTPD), octylated diphenylamine (ODPA), phenyl-α-naphthylamine (PAN), phenyl-β-naphthylamine (PBN), preferably ones based on phenylenediamine, are also used. Examples of phenylenediamines are N-isopropyl-N'-phenyl-p-phenylenediamine, N-1,3-dimethylbutyl-N'-phenyl-p-phenylenediamine (6PPD), N-1,4-dimethylpentyl-N'-phenyl-p-phenylenediamine (7PPD), N,N'-bis-1,4-(1,4-dimethylpentyl)-p-phenylenediamine (77PD), etc.

The other ageing inhibitors include phosphites such as tris(nonylphenyl)phosphite, polymerized 2,2,4-trimethyl-1,2-dihydroquinoline (TMQ), 2-mercaptobenzimidazole (MBI), methyl-2-mercaptobenzimidazole (MBI), zinc methylmercaptobenzimidazole (ZMBI). The phosphites are generally used in combination with phenolic ageing inhibitors. TMQ, MBI and MMBI are used particularly for NBR grades which are vulcanized peroxidically.

The latex having a pH of at least 6, preferably >6, is used for the coagulation. If appropriate, this pH is set by addition of a base, preferably ammonia or sodium hydroxide or potassium hydroxide.

The coagulation of the latex is carried out using at least one magnesium salt. The use of magnesium chloride, magnesium sulphate and/or magnesium nitrate is appropriate. Preference is given to using magnesium chloride.

In addition to the use of at least one magnesium salt, preferably in the form of magnesium chloride, for the coagulation, it is also possible to use up to 5% by weight of one or more other salts of one or more other divalent metals, based on the total amount of all salts used for the coagulation.

Furthermore, it is possible to use up to X % by weight of a salt of a monovalent metal, based on the total amount of all salts used for the coagulation, where X % by weight is 50% by weight minus the % by weight of one or more other salts of one or more other divalent metals, if present.

If no other salts of divalent metals are present in the coagulation, it is thus possible to use, for example, up to 50% by weight of potassium salts, preferably potassium chloride, and/or of sodium salts, preferably sodium chloride, based on the total amount of salts used. Impurities in the form of calcium salts or active additions of calcium salts, preferably calcium chloride, should not exceed 5% by weight, based on the total amount of all salts used, with the percentages by weight of the salts of a monovalent metal being correspondingly reduced if such calcium salts are present.

The coagulation of the latex is carried out using from 0.1 to 10% by weight, preferably from 0.5 to 5% by weight, of at least one magnesium salt, based on nitrile rubber. Preference is given to using just those amounts of magnesium salt which are required for complete coagulation of the nitrile rubber and are determined beforehand on aliquots of the latex to be coagulated.

The concentration of the magnesium salt solution, preferably the magnesium chloride solution, is usually from 0.1 to 35% by weight, preferably from 0.5 to 30% by weight.

The aqueous solution of at least one magnesium salt, preferably of magnesium chloride, is prepared using deionized water or water which has not been deionized and thus contains calcium ions. When water containing calcium ions is used, care should be taken to ensure that the amount of calcium from a) any impurities in the magnesium salt and b) the water used does not exceed 5% by weight, preferably 1% by weight, based on the total amount of all salts used.

Before coagulation of the latex, the pH of the latex is set to at least 6, preferably >6, by addition of bases. It is possible to use, for example, ammonia, sodium hydroxide or potassium hydroxide for setting the pH.

The coagulation of the latex can be achieved by adding the salt solution to the latex or alternatively by placing the latex in a vessel and adding the salt solution. The coagulation of the latex is carried out continuously or batchwise. Preference is given to continuous coagulation which is carried out with the aid of nozzles.

In the process of the invention, it is important that the temperature of the latex is set to a value below 45° C. before addition of the magnesium salt. Only in this way is it ensured that a very finely divided coagulum is formed at the instance of addition of salt to the latex. After the salt addition, the mixture can, if desired, be heated to temperatures of up to 100° C., preferably to a temperature in the range from 50 to 90° C. During this heating to elevated temperatures, relatively large particles which have diameters of >5 mm and can be filtered off are formed.

In addition to the above-described salt or salts as electrolytes, precipitation aids can also be used in the coagulation. Possible precipitation aids are, for example, water-soluble polymers. The water-soluble polymers are non-ionic, anionic or cationic.

Examples of non-ionic polymeric precipitation aids are modified cellulose such as hydroxyalkylcellulose or methylcellulose and also adducts of ethylene oxide and propylene oxide onto compounds having an acidic hydrogen. Examples of compounds having an acidic hydrogen are: fatty acids, sugars such as sorbitol, monoglycerides and diglycerides of fatty acids, phenol, alkylated phenols, (alkyl)phenol-formaldehyde condensates, etc. The addition products of ethylene oxide and propylene oxide onto these compounds can have a random or blocked structure. Among these products, preference is given to those whose solubility decreases with increasing temperature. Characteristic clouding temperatures are in the range from 0 to 100° C., in particular in the range from 20 to 70° C.

Examples of anionic polymeric precipitation aids are the homopolymers and copolymers of (meth)acrylic acid, maleic acid, maleic anhydride, etc. Preference is given to the Na salt of polyacrylic acid.

Cationic polymeric precipitation aids are usually based on polyamines or on homopolymers and copolymers of (meth)acrylamide. Preference is given to polymethacrylamides and polyamines, in particular those based on epichlorohydrin and dimethylamine.

The amounts of polymeric precipitation aids are from 0.01 to 5 parts by weight, preferably from 0.05 to 2.5 parts by weight, per 100 parts by weight of nitrile rubber.

The use of other precipitation aids is also conceivable. However, it may be remarked that it is readily possible to carry out the process of the invention with the desired success in the absence of additional precipitation aids and, in particular, in the absence of $C_1$-$C_4$-alkylcelluloses, hydroxyalkylcelluloses, plant-based protein-like materials or polysaccharides such as starch or water-soluble polyamine compounds.

The latex used for the coagulation advantageously has a solids concentration in the range from 1% to 40%, preferably in the range from 5% to 35% and particularly preferably in the range from 15 to 30% by weight.

Washing of the Coagulated Nitrile Rubber:

After the coagulation, the nitrile rubber is usually present in the form of crumb. The washing of the coagulated NBR is therefore also referred to as crumb washing. It is possible to use either deionized water, DW, or water which has not been deionized, BW, for washing this coagulated crumb. If no calcium salt is present in the indicated possible amounts (up to 5% by weight of all salts used) in the coagulation of the latex using at least one magnesium salt, it has been found to be useful to use water which has not been deionized and thus contains calcium ions in the washing of the coagulated NBR.

Washing is carried out at a temperature in the range from 15 to 90° C., with a temperature in the range from 45 to 70° C. being preferred.

The amount of washing water is from 0.5 to 20 parts by weight, preferably from 1 to 10 parts by weight and particularly preferably from 1 to 5 parts by weight, per 100 parts by weight of nitrile rubber.

The rubber crumb is preferably subjected to multistage washing, with the rubber crumb being partially dewatered between the individual washing stages. The residual moisture contents of the crumb between the individual washing stages are in the range from 5 to 50% by weight, preferably in the range from 7 to 25% by weight. The number of washing stages is usually from 1 to 7, preferably from 1 to 3. Washing is carried out batchwise or continuously. Preference is given to using a multistage, continuous process, with countercurrent washing being preferred in order to save water.

Dewatering and Drying:

After washing is complete, the nitrile rubber crumb is typically dewatered. This is usually carried out in two stages. In the first stage, the rubber crumb is subjected to preliminary mechanical dewatering. In the second stage, the remaining water is evaporated. Both preliminary dewatering and drying are preferably carried out continuously. Suitable apparatuses for the preliminary mechanical dewatering are strainer screws in which the water is squeezed out laterally via a strainer slit or screws in which mechanical dewatering is effected against the product stream (Welding principle).

The cation contents remaining in the nitrile rubber can be additionally influenced if desired by the degree of preliminary mechanical dewatering. This can be advantageous particularly when inefficient washing is employed. Efficient washing gives the appropriate cation contents immediately after washing. The water contents after preliminary mechanical dewatering are in the range from 5 to 25% by weight. To adjust the cation mix remaining in the product, it has been found to be useful for the water contents after preliminary mechanical dewatering to be from 5 to 15% by weight, in particular from 5 to 10% by weight.

Drying of the nitrile rubber which has been subjected to preliminary dewatering is carried out in a fluidized-bed dryer or in a plate dryer. The temperatures during drying are in the range from 80 to 150° C. Preference is given to drying according to a temperature programme, with the temperature being reduced towards the end of the drying process.

The nitrile rubbers of the invention which have the specified content of cations and thus an ion index in the range indicated and also the specific magnesium content surprisingly have the desired high vulcanization rate (difference of initial vulcanization time minus full vulcanization time) and the vulcanizates obtained have a very good modulus.

The invention therefore also provides for the use of the nitrile rubbers of the invention for producing vulcanizable mixtures containing at least one nitrile rubber according to the invention, at least one crosslinker and optionally further additives.

These vulcanizable mixtures are produced by mixing at least one nitrile rubber according to the invention, at least one crosslinker and optionally further additives.

As crosslinker, it is possible to use, for example, peroxidic crosslinkers such as bis(2,4-dichlorobenzyl)peroxide, dibenzoyl peroxide, bis(4-chlorobenzoyl)peroxide, 1,1-bis-(t-butylperoxy)-3,3,5-trimethylcyclohexane, tert-butyl perbenzoate, 2,2-bis(t-butylperoxy)butene, 4,4-di-tert-butylperoxynonyl valerate, dicumyl peroxide, 2,5-dimethyl-2,5-di(t-butylperoxy)hexane, tert-butyl cumyl peroxide, 1,3-bis(t-butylperoxyisopropyl)benzene, di-t-butyl peroxide and 2,5-dimethyl-2,5-di(t-butylperoxy)hex-3-yne.

It can be advantageous to use not only these peroxidic crosslinkers but also further additives by means of which the crosslinking yield can be increased: suitable additives of this type are, for example, triallyl isocyanurate, triallyl cyanurate, trimethylolpropane tri(meth)acrylate, triallyl trimellitate, ethylene glycol dimethacrylate, butanediol dimethacrylate, trimethylolpropane trimethacrylate, Zn diacrylate, Zn dimethacrylate, 1,2-polybutadiene or N,N'-m-phenylenedimaleimide.

The total amount of the crosslinker or crosslinkers is usually in the range from 1 to 20 phr, preferably in the range from 1.5 to 15 phr and particularly preferably the range from 2 to 10 phr, based on the nitrile rubber.

It is also possible to use sulphur in elemental soluble or insoluble form or sulphur donors as crosslinker.

Possible sulphur donors are, for example, dimorpholyl disulphide (DTDM), 2-morpholino-dithiobenzothiazol (MBSS), caprolactam disulphide, dipentamethylenethiuram tetrasulphide (DPTT), and tetramethylthiuram disulphide (TMTD).

In the sulphur vulcanization of the nitrile rubbers of the invention, too, it is possible to use further additives by means of which the crosslinking yield can be increased. However, crosslinking can in principle also be carried out using sulphur or sulphur donors alone.

Conversely, crosslinking of the nitrile rubbers of the invention can also be carried out only in the presence of the above-mentioned additives, i.e. without addition of elemental sulphur or sulphur donors.

Suitable additives by means of which the crosslinking yield can be increased are, for example, dithiocarbamates, thiurams, thiazoles, sulphenamides, xanthogenates, guanidine derivatives, caprolactams and thiourea derivatives.

As dithiocarbamates, it is possible to use, for example: ammonium dimethyldithiocarbamate, sodium diethyldithiocarbamate (SPEC), sodium dibutyldithiocarbamate (SDBC), zinc dimethyl-dithiocarbamate (ZDMC), zinc diethyldithiocarbamate (ZDEC), zinc dibutyldithiocarbamate (ZDBC), zinc ethylphenyldithiocarbamate (ZEPC), zinc dibenzyldithiocarbamate (ZBEC), zinc pentamethylenedithiocarbamate (Z5MC), tellurium diethyldithiocarbamate, nickel dibutyl-dithiocarbamate, nickel dimethyldithiocarbamate and zinc diisononyldithiocarbamate.

As thiurams, it is possible to use, for example: tetramethylthiuram disulphide (TMTD), tetramethylthiuram monosulphide (TMTM), dimethyldiphenylthiuram disulphide, tetrabenzylthiuram disulphide, dipentamethylenethiuram tetrasulphide and tetraethylthiuram disulphide (TETD).

As thiazoles, it is possible to use, for example: 2-mercaptobenzothiazole (MBT), dibenzthiazyl disulphide (MBTS), zinc mercaptobenzothiazole (ZMBT) and copper-2-mercaptobenzothiazole.

As sulphonamide derivatives, it is possible to use, for example: N-cyclohexyl-2-benzothiazylsulphenamide (CBS), N-tert-butyl-2-benzothiazylsulphenamide (TBBS), N,N'-dicyclohexyl-2-benzothiazylsulphenamide (DCBS), 2-morpholinothiobenzothiazole (MBS), N-oxydiethylenethiocarbamyl-N-tert-butylsulphenamide and oxydiethylenethiocarbamyl-N-oxy-ethylenesulphenamide.

As xanthogenates, it is possible to use, for example: sodium dibutylxanthogenate, zinc isopropyl-dibutylxanthogenate and zinc dibutylxanthogenate.

As guanidine derivatives, it is possible to use, for example: diphenylguanidine (DPG), di-o-tolylguanidine (DOTG) and o-tolylbiguanide (OTBG).

As dithiophosphates, it is possible to use, for example: zinc dialkydithiophosphate (chain length of the alkyl radicals: $C_2$ to $C_{16}$), copper dialkyldithiophosphates (chain length of the alkyl radicals: $C_2$ to $C_{36}$) and dithiophosphoryl polysulphide.

As caprolactam, it is possible to use, for example, dithiobis-caprolactam.

As thiourea derivatives, it is possible to use, for example, N,N'-diphenylthiourea (DPTU), diethylthiourea (DETU) and ethylenethiourea (ETU).

Further suitable additives are, for example: zinc diaminediisocyanate, hexamethylenetetramine, 1,3-bis(citraconimidomethyl)benzene and cyclic disulphanes.

Both the additives mentioned and the crosslinkers can be used either individually or in mixtures. Preference is given to using the following substances for crosslinking the nitrile rubbers: sulphur, 2-mercaptobenzothiazol, tetramethylthiuram disulphide, tetramethylthiuram monosulphide, zinc dibenzyldithiocarbamate, dipentamethylenethiuram tetrasulphide, zinc dialkydithiophosphate, dimorpholyl disulphide, tellurium diethyldithiocarbamate, nickel dibutyldithiocarbamate, zinc dibutyldithiocarbamate, zinc dimethyldithiocarbamate and dithiobiscaprolactam.

The crosslinkers and abovementioned additives can each be used in amounts of from about 0.05 to 10 phr, preferably from 0.1 to 8 phr, in particular from 0.5 to 5 phr (single addition, in each case based on the active substance).

In sulphur crosslinking according to the invention, it may also be useful to employ further inorganic or organic substances in addition to the crosslinkers and abovementioned additives. Examples of such further substances are: zinc oxide, zinc carbonate, lead oxide, magnesium oxide, saturated or unsaturated organic fatty acids and their zinc salts, polyalcohols, amino alcohols such as triethanolamine and also amines such as dibutylamine, dicyclohexylamine, cyclohexylethylamine and polyether amines.

In addition, it is also possible to use initial vulcanization inhibitors. These include cyclohexylthiophthalimide (CTF), N,N-dinitrosopentamethylenetetramine (DNPT), phthalic anhydride (PTA) and diphenylnitrosamine. Preference is given to cyclohexylthiophthalimide (CTP).

Apart from the addition of the crosslinker or crosslinkers, the nitrile rubber of the invention can also be mixed with further customary rubber additives.

These include, for example, the typical substances which are adequately known to those skilled in the art, for example fillers, filler activators, ozone protection agents, ageing inhibitors, antioxidants, processing aids, extender oils, plasticizers, reinforcing materials and mould release agents.

As fillers, it is possible to use, for example, carbon black, silica, barium sulphate, titanium dioxide, zinc oxide, calcium oxide, calcium carbonate, magnesium oxide, aluminium oxide, iron oxide, aluminium hydroxide, magnesium hydroxide, aluminium silicates, diatomaceous earth, talc, kaolins, bentonites, carbon nanotubes, Teflon (the latter preferably in powder form) or silicates.

Possible filler activators are, in particular, organic silanes such as vinyltrimethyloxysilane, vinyldimethoxymethylsilane, vinyltriethoxysilane, vinyltris(2-methoxyethoxy)silane, N-cyclo-hexyl-3-aminopropyltrimethoxysilane, 3-aminopropyltrimethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxysilane or (octadecyl)methyldimethoxysilane. Further filler activators are, for example, surface-active substances such as triethanolamine and ethylene glycols having molecular weights of from 74 to 10 000 g/mol. The amount of filler activators is usually from 0 to 10 phr, based on 100 phr of the nitrile rubber.

As ageing inhibitors, it is possible to add those which have already been described in the present application in respect of coagulation of the latex to the vulcanizable mixtures. These are usually used in amounts of about 0-5 phr, preferably from 0.5 to 3 phr, based on 100 phr of the nitrile rubber.

Possible mould release agents are, for example: saturated and partially unsaturated fatty acids and oil acids and their derivatives (fatty acid esters, fatty acid salts, fatty alcohols, fatty acid amides), which are preferably employed as constituents of the mixture, also products which can be applied to the mould surface, for example products based on low molecular weight silicone compounds, products based on fluoropolymers and products based on phenolic resins.

When used as constituents of the mixture, the mould release agents are used in amounts of about 0-10 phr, preferably from 0.5 to 5 phr, based on 100 phr of the nitrile rubber.

Reinforcement by means of strength carriers (fibres) composed of glass, according to the teachings of U.S. Pat. No. 4,826,721, is also possible as is reinforcement by means of cords, woven fabrics, fibres composed of aliphatic and aromatic polyamides (Nylon®, Aramid®), polyesters and natural fibre products.

The invention further provides a process for producing mouldings based on at least one nitrile rubber according to the invention, which is characterized in that the above-described vulcanizable mixture is vulcanized in a shaping process, preferably using an injection-moulding process.

The invention thus likewise provides the specific shaped part which can be obtained by the abovementioned vulcanization process.

This process makes it possible to produce a large number of mouldings, e.g. a seal, a cap, a hose or a diaphragm. The nitrile rubbers of the invention having the specific ion index are particularly suitable for producing an O-ring seal, a flat seal, a corrugated sealing ring, a sealing sleeve, a sealing cap, a dust protection cap, a plug seal, a thermalinsulation hose (with or without addition of PVC), an oil cooler hose, an air intake hose, a servo control hose or a pump diaphragm.

In the alternative to the direct preparation of shaped parts on the basis of the inventive nitrile rubbers it is also possible that the preparation of the inventive nitrile rubber is followed either (i) by a metathetic degradation process or (ii) a metathetic degradation process and a subsequent hydrogenation or (iii) only a hydrogenation. This metathetic degradation process and the hydrogenation reactions are both adequately known to those skilled in the art and described in literature.

The metathesis is e.g. known from WO-A-02/100941 as well as from WO-A-02/100905.

It is possible to cary out the hydrogenation with use of homogeneous or heterogeneous hydrogenation catalysts. It is also possible to carry out the hydrogenation in situ, i.e. in the same reaction vessel in which the optional metathetic degradation has previously also been carried out and without the necessity of isolating the degraded nitrile rubber. The hydrogenation catalyst is simply added to the reaction vessel.

The catalysts used are usually based on rhodium, ruthenium or titanium, but it is also possible to use platinum, iridium, palladium, rhenium, ruthenium, osmium, cobalt or copper either as metal or preferably in the form of metal compounds (cf., for example, U.S. Pat. No. 3,70,637, DE-A-25 39 132, EP-A-0 134 023, DE-A-35 41 689, DE-A-35 40 918, EP-A-0 298 386, DE-A-35 29 252, DE-A-34 33 392, U.S. Pat. No. 4,464,515 and U.S. Pat. No. 4,503,196).

Suitable catalysts and solvents for a hydrogenation in the homogeneous phase are described below and are also known from DE-A-25 39 132 and EP-A-0 471 250.

The selective hydrogenation can be achieved, for example, in the presence of a rhodium- or ruthenium-containing catalyst. It is possible to use, for example, a catalyst of the general formula

$(R^1{}_mB)_lMX_n$, where M is ruthenium or rhodium, the radicals $R^1$ are identical or different and are each a ($C_1$-$C_8$-alkyl group, a $C_4$-$C_8$-cycloalkyl group, a $C_6$-$C_{15}$-aryl group or a $C_7$-$C_{15}$-aralkyl group. B is phosphorus, arsenic, sulphur or a sulphoxide group S=O, X is hydrogen or an anion, preferably halogen and particularly preferably chlorine or bromine, l is 2, 3 or 4, m is 2 or 3 and n is 1, 2 or 3, preferably 1 or 3. Preferred catalysts are tris(triphenylphosphine)rhodium(I) chloride, tris(triphenylphosphine)rhodium(III) chloride and tris(dimethyl sulphoxide)rhodium(III) chloride and also tetrakis (triphenylphosphine)rhodium hydride of the formula $(C_6H_5)_3P)_4RhH$ and the corresponding compounds in which the triphenylphosphine has been completely or partly replaced by tricyclohexylphosphine. The catalyst can be utilized in small amounts. An amount in the range 0.01-1% by weight, preferably in the range 0.03-0.5% by weight and particularly preferably in the range 0.1-0.3% by weight, based on the weight of the polymer, is suitable.

It is usually appropriate to use the catalyst together with a co-catalyst which is a ligand of the formula $R^1{}_mB$, where $R^1$, m and B have the meanings given above for the catalyst. Preferably, m is 3, B is phosphorus and the radicals $R^1$ can be identical or different. Preference is given to cocatalysts having trialkyl, tricycloalkyl, triaryl, triaralkyl, diaryl-monoalkyl, diaryl-monocycloalkyl, dialkyl-monoaryl, dialkyl-monocycloalkyl, dicycloalkyl-monoaryl or dicycloalkyl-monoaryl radicals.

Examples of co-catalysts may be found in, for example, U.S. Pat. No. 4,631,315. A preferred cocatalyst is triphenylphosphine. The co-catalyst is preferably used in amounts in the range 0.3-5% by weight, preferably in the range 0.5-4% by weight, based on the weight of the nitrile rubber to be hydrogenated. Furthermore, the weight ratio of the rhodium-containing catalyst to the cocatalyst is preferably in the range from 1:3 to 1:55, more preferably in the range from 1:5 to 1:45. Based on 100 parts by weight of the nitrile rubber to be hydrogenated, it is appropriate to use from 0.1 to 33 parts by weight of the cocatalyst, preferably from 0.5 to 20 parts by weight and very particularly preferably from 1 to 5 parts by weight, in particular more than 2 but less than 5 parts by weight, of cocatalyst per 100 parts by weight of the nitrile rubber to be hydrogenated.

The practical implementation of this hydrogenation is adequately known to those skilled in the art from U.S. Pat. No. 6,683,136. It is usually carried out by treating the nitrile rubber to be hydrogenated in a solvent such as toluene or monochlorobenzene with hydrogen at a temperature in the range from 100 to 150° C. and a pressure in the range from 50 to 150 bar for from 2 to 10 hours.

For the purposes of the present invention, hydrogenation is a reaction of the double bonds present in the starting nitrile rubber to an extent of at least 50%, preferably 70-100%, particularly preferably 80-100%.

When heterogeneous catalysts are used, these are usually supported catalysts based on palladium which are, for example, supported on carbon, silica, calcium carbonate or barium sulphate.

In analogy to the inventive nitrile rubbers the optionally hydrogenated nitrile rubbers obtained after the metathesis and/or hydrogenation reaction of the inventive nitrile rubber may be incorporated into a vulcanizable mixture and used for producing mouldings and shaped parts. Such optionally hydrogenated nitrile rubbers have a Mooney-viscosity (ML (1+4@100° C.)) of 1 to 50, preferably of from 1 to 40 Mooney units.

EXAMPLES

General:
I Determination of the Cation Contents for the Ion Index
To determine the cation contexts, 0.5 g of the nitrile rubbers were digested by dry ashing at 550° C. in a platinum crucible with subsequent distillation of the ash in hydrochloric acid. After appropriate dilution of the digestion solution with deionized water, the metal contents are measured by ICP-OES (inductively coupled plasma-optical emission spectrometry) at the following wavelengths:
Calcium: 317.933 nm,
Magnesium: 285.213 nm
Potassium: 766.491 nm,
Sodium: 589.592 nm
against calibration solutions matched to the acid matrix. Depending on the concentration of the elements in the digestion solution and the sensitivity of the measuring instrument used, the concentrations of the sample solutions were matched to the linear region of the calibration for the wavelengths used in each case (B. Welz "Atomic Absorption Spectrometry", 2nd Ed., Verlag Chemie, Weinheim 1985)

II Initial Vulcanization Behaviour and Vulcanization Rate
The initial vulcanization behaviour (Mooney scorch) is determined at 120° C. by means of a shear disc viscosimeter in accordance with DIN 53 523. A small rotor (S) is used for the determination. MS 5 (120° C.) is the time in minutes during which the Mooney value increases by 5 Mooney units from the minimum value.

The vulcanization rate is determined at 160° C. in accordance with DIN 53 529, part 3, by means of a rheometer from Monsanto (MDR 2000E) as the difference $t_{90}$–$t_{10}$, where $t_{10}$ and $t_{90}$ are the vulcanization times at which 10% and 90%, respectively, of the finale degree of vulcanization are attained.

The vulcanization behaviour of the mixtures was determined in the rheometer at 160° C. in accordance with DIN 53 529. In this way, the characteristic vulcanization times $t_{10}$ and $t_{90}$ were determined.

III Mechanical Properties
The mechanical properties of the rubbers (e.g. stress at various elongations, ultimate tensile strength and elongation at break) are determined on vulcanizates in accordance with DIN 53 504.

A NBR Production by Emulsion Polymerization
Two NBR latices A and B were produced on the basis of the formulations shown in Table 1 below. Amounts of all starting materials are given in parts by weight per 100 parts by weight of the monomer mixture. The polymerization was carried out at a temperature of 13° C. for a period of 13.5 hours until a polymerization conversion of 80% had been reached.

TABLE 1

| | Latex No. | |
|---|---|---|
| | A | B |
| Butadiene | 73 | 73 |
| Acrylonitrile | 27 | 27 |
| Total amount of water | 220 | 220 |
| Erkantol ® BXG[1] | 3.67 | 3.67 |
| Baykanol ® PQ[2] | 1.10 | 1.10 |
| K salt of coconut fatty acid | 0.73 | 0.73 |
| KOH | 0.05 | 0.05 |
| t-DDM[7] | 0.24/0.24 | 0.24/0.24 |
| Potassium peroxodisulphate[3] | 0.39/0.19 | 0.39/0.19 |
| Tris(α-hydroxyethyl)amine[4] | 0.55 | 0.55 |
| Na dithionite[5] | 1.19 | 1.0 |
| Diethylhydroxylamine | 0 | 0.5 |
| Potassium hydroxide | 1.28 | 1.28 |
| Vulkanox ® KB[6] | 1.25 | 1.25 |

[1] Sodium salt of a mixture of monosulphonated and disulphonated naphthalenesulphonic acids having isobutylene oligomer substituents (Erkantol ® BXG)
[2] Sodium salt of methylenebisnaphthalene sulphonate (Baykanol ® PQ, Lanxess Deutschland GmbH)
[3] Aldrich catalogue number: 21,622-4
[4] Aldrich catalogue number: T5,830-0
[5] Aldrich catalogue number: 15,795-3
[6] 2,6-di-tert-butyl-p-cresol from Lanxess Deutschland GmbH
[7] t-DDM (tertiary dodecyl mercaptane): $C_{12}$-mercaptane mixture from Lanxess Deutschland GmbH If two numerical values are given in one of the columns for the nitrile rubbers A and B in Table 1 above, this means that the total amount of the respective starting material was not introduced in a single portion but instead a first part was placed in the polymerization vessel at the beginning of the polymerization and a second part was introduced subsequently. The conversions at which this further introduction was carried out are indicated below.

The NBR latex was produced batchwise in a 2 m³ autoclave provided within a stirrer. 350 kg of the monomer mixture and a total amount of water of 770 kg were used in the batch. The emulsifiers Erkantol® BXG (12.85 kg), Baykanol® PQ (3.85 kg) and the potassium salt of coconut fatty acid (2.56 kg) and 84 g of potassium hydroxide together with 609 kg of the water were placed in the autoclave and flushed by means of a stream of nitrogen. After flushing with nitrogen is complete, the destabilized monomers (255.5 kg of butadiene and 94.5 kg of acrylonitrile) and part of the regulator t-DDM (0.84 kg) were introduced into the reactor. The reactor was then closed. The remaining amount of water (161 kg) was used for preparing the aqueous solutions of tris(α-hydroxyethyl)amine, potassium peroxodisulphate and the stopper solutions. The polymerization was started at 1.7° C. by addition of aqueous solutions of 1.365 kg of potassium peroxodisulphate (corresponding to the 0.39 part by weight shown in Table 1) and 1.925 kg of tris(α-hydroxy-ethyl)amine (corresponding to the 0.55 part by weight shown in Table 1) and the polymerization mixture was maintained at this temperature over the entire polymerization time. The course of the polymerization was followed by gravimetric determinations of the conversion. At a polymerization conversion of 15%, a further 0.84 kg of regulator t-DDM (corresponding to the 0.24 part by weight shown in Table 1) and 0.665 kg of potassium peroxodisulphate (corresponding to the 0.19 parts by weight shown in Table 1) were introduced. When a conversion of 80% had been reached (13.5 h), the polymerization was stopped by addition of an aqueous solution of sodium dithionite and potassium hydroxide (latex A) or sodium dithionite/N,N-diethylhydroxylamine (DEHA) and potassium hydroxide (latex B). Unreacted monomers and other volatile constituents were removed by means of steam distillation.

The characteristic data of the two latices are summarized in Table 2 below.

TABLE 2

| | Latex No. | |
|---|---|---|
| | A | B |
| Particle diameter ($d_{50}$) [nm] | 360 | 370 |
| Solids content [% by weight] | 18.9 | 20.4 |
| pH value | 8.9 | 9.7 |
| Acrylonitrile content [% by weight] | 28.9 | 28.0 |

Before coagulation of the NBR latices, these were admixed with a 50% strength dispersion of Vulkanox® KB (1.2.5% by weight of Vulkanox®KB based on NBR solid). The Vulkanox® KB-dispersion was prepared at 95-98° C. by means of an Ultraturrax and comprised:

360 g of deionized water (DW)
40 g of alkylphenol polyglycol ether (EmulgatorNP10 from Lanxess Deutschland GmbH)
400 g of Vulkanox ® KB from Lanxess Deutschland GmbH B Work-Up of the Latex The concentration of the salt solution and the amounts of salt used for the precipitation were in each case calculated without water of crystallization. The salts used in the coagulation of the latex, the concentration of the salt solutions, the amounts of salt used based on the NBR, the coagulation temperature, the temperature during washing and the duration of washing are listed in the following tables.

The amounts of salt were in each case selected on the basis of preliminary experiments so that the rubber crumb formed in coagulation of the latex had a particle size of greater than 5 mm so that in the subsequent washing of the crumb it would not be carried out by the stream of washing water.

25 kg of latex were in each case worked up to produce the solid. Coagulation of the latex was carried out batchwise in a stirrable, open vessel having a capacity of 100 l. Here, the latex was placed in the coagulation vessel, then heated to the temperatures shown in column 6 of Tables 3 and 4 if these were above 20° C., the aqueous salt solution was subsequently added at this temperature while stirring and the reaction mixture was then heated to the temperatures shown in column 7 of Tables 3 and 4.

For washing of the crumb, the 100 l coagulation vessel was provided with an inlet and outlet. Two rails were installed on the inside of the vessel so that the outlet could be shut off by means of a screen (mesh opening 2 mm) before washing was carried out, so that the coagulated crumb was not discharged with the water during washing. Washing was carried out at a constant water throughput of 200 l/h. Both deionized water (DW) and normal mains water ("BW") were used for washing.

In the major part of the experiments, the latex serum obtained during coagulation of the latex was not removed from the coagulation vessel before commencement of washing; i.e. the latex serum was removed by dilution washing. The boundary conditions employed in washing of the crumb (type of water, washing temperature, washing time, etc.) are listed in the following tables.

The conditions employed in each case in the work-up of the latices of the nitrile rubbers A and B are summarized in Tables 3, 4 and 5.

In column 4 of Tables 3, 4 and 5, the "DW" or "BW" after the concentration of the salt solution indicates the type of water used for preparing the salt solution.

TABLE 3

Examples 1-8 according to the invention (coagulation of the latex using MgCl$_2$)

| | Latex properties | | | Precipitation conditions | | | | Washing conditions | | |
|---|---|---|---|---|---|---|---|---|---|---|
| Example | Latex type | pH | Type of Salt | Conc. of the salt solution [% by weight] | Amount of salt based on NBR [% by weight] | Temperature of the latex on addition of salt [° C.] | Temperature of the crumb dispersion after heating [° C.] | Type of water | T [° C.] | Time [h] |
| 1 | B | 9.7 | MgCl$_2$ | 0.8/BW | 8 | 20 | 20 | BW | 20 | 5 |
| 2 | B | 9.7 | MgCl$_2$ | 0.8/BW | 8 | 20 | 20 | DW | 20 | 5 |
| 3 | B | 9.7 | MgCl$_2$ | 1.6/BW | 16 | 20 | 20 | BW | 20 | 5 |
| 4 | A | 8.4 | MgCl$_2$ | 20/DW | 1.9 | 45 | 45 | BW | 60 | 5 |
| 5 | B | 9.7 | MgCl$_2$ | 20/BW | 2.37 | 20 | 45 | BW | 60 | 8 |
| 6 | B | 9.7 | MgCl$_2$ | 20/BW | 2.37 | 20 | 70 | BW | 60 | 8 |
| 7 | B | 9.7 | MgCl$_2$ | 20/BW | 2.37 | 20 | 80 | BW | 60 | 8 |
| 8 | B | 9.7 | MgCl$_2$ | 20/BW | 2.37 | 20 | 90 | BW | 60 | 8 |

TABLE 4

Examples 9-13 which are not according to the invention (coagulation of the latex using MgCl$_2$, but temperature of the latex before addition of the salt solution = 60° C.)

| | Latex properties | | | Precipitation conditions | | | | Washing conditions | | |
|---|---|---|---|---|---|---|---|---|---|---|
| Example | Latex type | pH | Type of Salt | Conc. of the salt solution [% by weight] | Amount of salt based on NBR [% by weight] | Temperature of the latex on addition of salt [° C.] | Temperature of the crumb dispersion after heating [° C.] | Type of water | T [° C.] | Time [h] |
| 9 | A | 8.4 | MgCl$_2$ | 30/DW | 1.9 | 60 | 60 | BW | 60 | 2.5 |
| 10 | A | 8.4 | MgCl$_2$ | 30/DW | 1.9 | 60 | 60 | BW | 20 | 2.5 |
| 11 | A | 8.4 | MgCl$_2$ | 30/DW | 1.9 | 60 | 60 | BW | 20 | 5.0 |
| 12 | A | 8.4 | MgCl$_2$ | 15/DW | 1.9 | 60 | 60 | BW | 45 | 2.5 |
| 13 | B | 9.7 | MgCl$_2$ | 15/DW | 1.9 | 60 | 69 | BW | 45 | 5.0 |

TABLE 5

Examples 14-18 which are not according to the invention (coagulation of the latex using CaCl$_2$)

| | Latex properties | | | Precipitation conditions | | | | Washing conditions | | |
|---|---|---|---|---|---|---|---|---|---|---|
| Example | Latex type | pH | Type of Salt | Conc. of the salt solution [% by weight] | Amount of salt based on NBR [% by weight] | Temperature of the latex on addition of salt [° C.] | Temperature of the crumb dispersion after heating [° C.] | Type of water | T [° C.] | Time [h] |
| 14 | A | 8.4 | CaCl$_2$ | 0.3 | 3 | 20 | 20 | DW | 20 | 3.8 |
| 15 | A | 8.4 | CaCl$_2$ | 0.6 | 6 | 20 | 20 | DW | 20 | 3.8 |
| 16 | A | 8.4 | CaCl$_2$ | 1.2 | 12 | 20 | 20 | DW | 20 | 3.5 |
| 17 | A | 5.8[1] | CaCl$_2$ | 1.2 | 12 | 20 | 20 | DW | 20 | 3.4 |

[1] Adjustment of the pH of the latex was carried out by addition of HCl before the addition of CaCl$_2$ After washing was complete, the rubber crumb was taken out by means of a sieve and subjected to preliminary dewatering to a residual moisture content of from 5 to 155% by weight in a Welding screw.

The final drying of the rubber samples which have been subjected to preliminary dewatering was carried out batchwise in a vacuum drying oven at 70° C. to a residual moisture content of <1.5% by weight.

To determine the cation contents, aliquots of the rubber samples were ashed in accordance with DIN 53 568 and the cations determined by mean of atomic absorption spectroscopy in accordance with DIN 51401.

The cation contents and the ion indices of the nitrile rubbers according to the invention and those which were not according to the invention from Tables 3, 4 and 5 are shown in Tables 7, 8 and 9.

TABLE 7

Cation content/ion indices of the NBRs according to the invention from Table 3

| | | Cation content | | | | |
|---|---|---|---|---|---|---|
| Example | Type of salt | Ca [ppm] | Mg [ppm] | Na [ppm] | K [ppm] | II |
| 1 | $MgCl_2$ | 490 | 98 | 10 | 5 | 48 |
| 2 | $MgCl_2$ | 163 | 164 | 6 | 3 | 32 |
| 3 | $MgCl_2$ | 430 | 136 | 16 | 7 | 48 |
| 4 | $MgCl_2$ | 575 | 57 | 64 | 20 | 47 |
| 5 | $MgCl_2$ | 400 | 83 | 29 | 8 | 39 |
| 6 | $MgCl_2$ | 215 | 101 | 47 | 14 | 26 |
| 7 | $MgCl_2$ | 225 | 107 | 51 | 16 | 28 |
| 8 | $MgCl_2$ | 171 | 111 | 36 | 11 | 25 |

TABLE 8

Cation content/ion indices of the NBRs which are not according to the invention from Table 4

| | | Cation content | | | | |
|---|---|---|---|---|---|---|
| Example | Type of salt | Ca [ppm] | Mg [ppm] | Na [ppm] | K [ppm] | II |
| 9 | $MgCl_2$ | 450 | 245 | 42 | 12 | 62 |
| 10 | $MgCl_2$ | 455 | 270 | 62 | 20 | 65 |
| 11 | $MgCl_2$ | 475 | 220 | 41 | 14 | 61 |
| 12 | $MgCl_2$ | 345 | 440 | 81 | 22 | 77 |
| 13 | $MgCl_2$ | 475 | 365 | 51 | 15 | 79 |

TABLE 9

Cation content/ion indices of the NBRs which are not according to the invention from Table 5

| | | Cation content | | | | |
|---|---|---|---|---|---|---|
| Example | Type of salt | Ca [ppm] | Mg [ppm] | Na [ppm] | K [ppm] | II |
| 14 | $CaCl_2$ | 1190 | 6 | 17 | 1 | 89 |
| 15 | $CaCl_2$ | 1290 | 3 | 12 | 1 | 97 |
| 16 | $CaCl_2$ | 1240 | 2 | 6 | 1 | 93 |
| 17 | $CaCl_2$ | 1235 | 2 | 8 | 1 | 93 |

The nitrile rubbers described in Tables 3, 4 and 5 were processed as shown in Table 10 in a 1.5 l mechanical laboratory mixer, with the individual constituents of the mixture being mixed in the order indicated in the table. All constituents of the mixture are reported in parts by weight per 100 parts by weight of nitrile rubber.

TABLE 10

Composition of the rubber mixtures

| Constituent of the mixture | Amount in parts by weight |
|---|---|
| NBR | 100.0 |
| Stearic acid | 2.0 |
| Zinc oxide | 5.0 |
| Carbon black N 330 | 40.0 |
| Phenol/formaldehyde resin (Plastikator ® FH) | 5.0 |
| N-cyclohexylbenzthiazylsulphenamide (Vulkacit ® CZ) | 0.9 |
| Sulphur | 1.5 |

The vulcanization behaviour of the mixtures was determined at 160° C. in accordance with DIN 53 529 by means of a Monsanto MDR 2000E rheometer. The characteristic vulcanization times $t_{10}$ and $t_{90}$ were determined in this way.

According to DIN 53 529, part 3:

| | |
|---|---|
| $t_{10}$: | time at which 10% of the conversion has been attained |
| $t_{90}$: | time at which 90% of the conversion has been attained |

The vulcanized test specimens required for the further measurements were produced by vulcanization at 160° C. under a hydraulic pressure of 120 bar for 30 minutes in the press. The stress at 300% elongation ($\sigma_{300}$), the tensile strength ($\sigma_{max}$) and the elongation at break ($\epsilon_b$) were determined by means of a tensile test in accordance with DIN 53504.

TABLE 11

Vulcanization behaviour and vulcanizate properties for the nitrile rubbers according to the invention from Table 3

| | | | Vulcanization | | | | Vulcanizate properties | | |
|---|---|---|---|---|---|---|---|---|---|
| Example | Type of salt | II | MS 5 (120° C.) [min] | $t_{10}$ [sec] | $t_{90}$ [sec] | $t_{90} - t_{10}$ [sec] | $\sigma_{300}$ [MPa] | $\sigma_{max.}$ [MPa] | $\epsilon_b$ [%] |
| 1 | $MgCl_2$ | 48 | 48 | 6.5 | 11.5 | 5.0 | 8.1 | 23.2 | 616 |
| 2 | $MgCl_2$ | 32 | 47 | 6.5 | 11.7 | 5.2 | 8.2 | 22.7 | 600 |
| 3 | $MgCl_2$ | 48 | 47 | 6.5 | 11.7 | 5.2 | 8 | 22.6 | 612 |
| 4 | $MgCl_2$ | 47 | 46 | 7 | 11.9 | 4.9 | 7.8 | 22.1 | 610 |
| 5 | $MgCl_2$ | 39 | 46 | 7.3 | 12.2 | 4.9 | 8.2 | 21.7 | 576 |

TABLE 11-continued

Vulcanization behaviour and vulcanizate properties for the nitrile rubbers according to the invention from Table 3

| Example | Type of salt | II | MS 5 (120° C.) [min] | $t_{10}$ [sec] | $t_{90}$ [sec] | $t_{90}-t_{10}$ [sec] | $\sigma_{300}$ [MPa] | $\sigma_{max.}$ [MPa] | $\epsilon_b$ [%] |
|---|---|---|---|---|---|---|---|---|---|
| 6 | MgCl$_2$ | 26 | 43 | 7.1 | 11.9 | 4.8 | 8.6 | 23.4 | 595 |
| 7 | MgCl$_2$ | 28 | 41 | 6.6 | 11.5 | 4.9 | 8.7 | 23.1 | 577 |
| 8 | MgCl$_2$ | 25 | 42 | 6.9 | 12.2 | 5.3 | 8.8 | 20.8 | 538 |

TABLE 12

Vulcanization behaviour and vulcanizate properties for the nitrile rubbers which are not according to the invention from Table 4

| Experiment | Type of salt | II | MS 5 (120° C.) [min] | $t_{10}$ [sec] | $t_{90}$ [sec] | $t_{90}-t_{10}$ [sec] | $\sigma_{300}$ [MPa] | $\sigma_{max.}$ [MPa] | $\epsilon_b$ [%] |
|---|---|---|---|---|---|---|---|---|---|
| 9  | MgCl$_2$ | 62 | 52 | 7.9 | 14.2 | 6.3 | 7.4 | 22.0 | 622 |
| 10 | MgCl$_2$ | 65 | 54 | 7.9 | 14.1 | 6.2 | 7.3 | 21.8 | 627 |
| 11 | MgCl$_2$ | 61 | 53 | 7.5 | 14.5 | 7.0 | 7.3 | 21.3 | 621 |
| 12 | MgCl$_2$ | 77 | 54 | 8.5 | 15.1 | 6.6 | 6.9 | 23.0 | 666 |
| 13 | MgCl$_2$ | 79 | 54 | 7.8 | 14.6 | 6.8 | 7.1 | 22.1 | 641 |

TABLE 13

Vulcanization behaviour and vulcanizate properties for the nitrile rubbers which are not according to the invention from Table 5

| Example | Type of salt | II | MS 5 (120° C.) [min] | $t_{10}$ [sec] | $t_{90}$ [sec] | $t_{90}-t_{10}$ [sec] | $\sigma_{300}$ [MPa] | $\sigma_{max.}$ [MPa] | $\epsilon_b$ [%] |
|---|---|---|---|---|---|---|---|---|---|
| 14 | CaCl$_2$ | 89 | 56 | 7.1 | 14.7 | 7.6  | 7.4 | 21.0 | 608 |
| 15 | CaCl$_2$ | 97 | 59 | 8.2 | 16.7 | 8.5  | 7.1 | 21.5 | 649 |
| 16 | CaCl$_2$ | 93 | 56 | 8.0 | 18.2 | 10.2 | 7.1 | 21.6 | 648 |
| 17 | CaCl$_2$ | 93 | 62 | 8.7 | 17.6 | 8.9  | 7.0 | 21.6 | 651 |

In Tables 11, 12 and 13, it is shown that the Mooney scorch, the vulcanization rate ($t_{90}-t_{10}$) and the vulcanizate properties, in particular the stress at 300% elongation ($\sigma_{300}$) depend essentially on the concentration and the relative ratio of the cations in the nitrile rubber. The properties of the nitrile rubbers are determined by the ion index and the magnesium content. It can be seen that the NBR latices according to the invention which have been coagulated by means of magnesium chloride display a lower Mooney scorch, shorter vulcanization times and higher stresses at 300% elongation than nitrile rubbers which are not according to the invention.

The invention claimed is:

1. A nitrile rubber comprising repeating units of at least one α,β-unsaturated nitrile, at least one conjugated diene and optionally one or more further copolymerizable monomers and has an ion index ("II") according to the general formula (I) in the range from 0 to 60 ppm×mol/g, $$II = 3\left[\frac{c(Ca^{2+})}{40\,g/mol} + \frac{c(Mg^{2+})}{24\,g/mol}\right] - \left[\frac{c(Na^+)}{23\,g/mol} + \frac{c(K^+)}{39\,g/mol}\right] \quad (I)$$

wherein $c(Ca^{2+})$, $c(Mg^{2+})$, $c(Na^+)$ and $c(K^+)$ indicate the concentrations of the calcium, magnesium, sodium and potassium ions in the nitrile rubber in ppm and the concentration of magnesium ions $c(Mg^{2+})$ is in the range from 50 to 250 ppm and the concentration of calcium ions $c(Ca^{2+})$ is in the range from 163 to 575 ppm.

2. The nitrile rubber according to claim 1 having an ion index in the range from 10 to 55 ppm×mol/g.

3. The nitrile rubber according to claim 1 which has a Mooney viscosity (ML (1+4 @100° C.)) of from 10 to 150 Mooney units.

4. The nitrile rubber according to claim 1 having a glass transition temperature in the range from −70° C. to +10° C.

5. The nitrile rubber according to claim 1 having an ion index in the range from in the range from 10 to 50 ppm×mol/g.

6. The nitrile rubber according to claim 1 comprising repeating units of acrylonitrile, 1,3-butadiene and optionally one or more further copolymerizable monomers.

7. The nitrile rubber according to claim 6 having repeating units of one or more copolymerizable monomers selected from the group consisting of methyl (meth)acrylate, ethyl (meth)acrylate, propyl (meth)acrylate, n-butyl (meth)acrylate, t-butyl (meth)acrylate, hexyl (meth)acrylate, 2-ethylhexyl (meth)acrylate, octyl (meth)acrylate or lauryl (meth)acrylate.

8. The nitrile rubber according to claim 6 having repeating units of one or more α,β-unsaturated monocarboxylic or dicarboxylic acids, their esters or amides.

9. The nitrile rubber according to claim 6 having repeating units of one or more copolymerizable monomers selected from the group consisting of alkyl ester of an α,β-unsaturated carboxylic acid.

10. A vulcanizable mixture containing at least one nitrile rubber according to claim 1, at least one crosslinker and optionally further additives.

11. A process for producing a vulcanizable mixture, said vulcanizable mixture containing at least one nitrile rubber according to claim 1, at least one crosslinker and optionally further additives, comprising:
   mixing the at least one nitrile rubber with the at least one crosslinker and said optionally further additives.

12. A process for producing moldings, comprising vulcanizing in a shaping process a vulcanizable mixture containing at least one nitrile rubber according to claim 1.

13. A molding obtainable by the process according to claim 12.

14. The molding according to claim 13, which is a seal, a cap, a hose or a diaphragm, in particular an O-ring seal, a flat seal, a corrugated sealing ring, a sealing sleeve, a sealing cap, a dust protection cap, a plug seal, a thermal insulation hose (with or without addition of PVC), an oil cooler hose, an air intake hose, a servo control hose or a pump diaphragm.

15. A process for producing the nitrile rubbers according to claim 1, comprising emulsion polymerizing of at least one α,β-unsaturated nitrile, at least one conjugated diene and optionally one or more further copolymerizable monomers, with the latex which is initially obtained in the polymerization and contains the nitrile rubber being subjected to coagulation and the coagulated nitrile rubber obtained subsequently being washed, characterized in that
   (i) the emulsion polymerization is carried out in the presence of at least one alkyl thiol containing 12-16 carbon atoms and at least three tertiary carbon atoms, with the sulphur being bound to one of these tertiary carbon atoms, and
   (ii) the pH of the latex obtained in the emulsion polymerization is set to at least 6 before coagulation and adding magnesium salt wherein the temperature of the latex is set to a value below 45° C. before addition of the magnesium salt,
   whereby said nitrile rubbers are formed.

16. The process according to claim 15, wherein the emulsion polymerization is carried out batchwise or continuously in a cascade of stirred vessels.

17. The process according to claim 15, wherein one or more ageing inhibitors are added to the latex containing the nitrile rubber before or during coagulation.

18. The process according to claim 15, wherein not only at least one magnesium salt but additionally up to X % by weight of a salt of a monovalent metal, based on the total amount of all salts used for the coagulation, is used in the coagulation of the latex, where the X % by weight is given by 50% by weight minus the % by weight of one or more other salts of one or more other divalent metals, if present.

19. The process according to claim 15, wherein from 0.1 to 10% by weight, of at least one magnesium salt, based on nitrile rubber, is used for coagulation of the latex.

20. The process according to claim 15, wherein the latex used for the coagulation has a solids concentration in the range from 1% to 40% by weight.

21. The process according to claim 15, wherein the latex is heated to a temperature of up to 100° C. after addition of the solution of at least one magnesium salt.

22. The process according to claim 15, wherein deionized water ("DW") or water which has not been deionized ("BW") is used for washing of the coagulated nitrile rubber.

23. The process according to claim 15, wherein the washing of the coagulated nitrile rubber is carried out at a temperature in the range from 15 to 90° C.

24. The process according to claim 15, wherein water which has not been deionized ("BW") is used for washing of the coagulated nitrile rubber if no calcium salt is present in the amounts of up to 5% by weight of all salts used in the coagulation of the latex using at least one magnesium salt.

25. The process according to claim 15, wherein magnesium chloride, magnesium sulphate and/or magnesium nitrate are/is used for coagulation of the latex.

26. The process according to claim 25, wherein the concentration of the solution of the magnesium chloride solution, is from 0.1 to 35% by weight.

27. The process according to claim 15, wherein at least one magnesium salt, and up to 5% by weight of one or more other salts of one or more other divalent metals, based on the total amount of all salts is used for the coagulation.

28. The process according to claim 27, wherein the magnesium salt is magnesium chloride.

29. The process according to claim 15, wherein the obtained nitrile rubber is subsequently subjected either (i) to a metathetic degradation reaction, (ii) a metathetic degradation reaction and a subsequent hydrogenation, or (iii) only a hydrogenation reaction.

30. An optionally hydrogenated nitrile rubber obtainable in the process according to claim 29.

31. A process for producing a vulcanizable mixture according to claim 30, by mixing at least one crosslinker and optionally further additives.

32. A vulcanizable mixture containing at least one optionally hydrogenated nitrile rubber according to claim 30, at least one crosslinker and optionally further additives.

33. A process for producing mouldings, comprising
   vulcanizing in a shaping process the vulcanizable mixture according to claim 32, thereby forming said mouldings.

* * * * *